United States Patent
Kim et al.

(10) Patent No.: US 8,906,254 B2
(45) Date of Patent: Dec. 9, 2014

(54) CATHODE MATERIAL FOR SECONDARY BATTERY AND MANUFACTURING METHOD OF THE SAME

(75) Inventors: Sa Heum Kim, Gyeonggi-do (KR); Dong Gun Kim, Gyeonggi-do (KR); Young Jun Kim, Gyeonggi-do (KR); Jun Ho Song, Gyeonggi-do (KR); Woo Suk Cho, Gyeonggi-do (KR); Jeom Soo Kim, Gyeonggi-do (KP); Dong Jin Kim, Gyeonggi-do (KR)

(73) Assignees: Hyundai Motor Company, Seoul (KR); Korea Electronics Technology Institute, Seongnam, Gyeonggi-do (KR)

( * ) Notice: Subject to any disclaimer, the term of this patent is extended or adjusted under 35 U.S.C. 154(b) by 223 days.

(21) Appl. No.: 13/484,715

(22) Filed: May 31, 2012

(65) Prior Publication Data

US 2013/0134362 A1  May 30, 2013

(30) Foreign Application Priority Data

Nov. 30, 2011  (KR) .................. 10-2011-0127265

(51) Int. Cl.
*H01M 4/88* (2006.01)

(52) U.S. Cl.
USPC ............. 252/182.1; 252/506; 252/519.3; 252/521.5; 423/301; 429/4; 429/50; 429/160; 429/218.1; 429/231.9; 429/323

(58) Field of Classification Search
CPC .............................. H01M 4/362; H01M 4/08
USPC ............. 252/182.1, 506, 519.3, 521.5; 429/4, 429/50, 224, 231.9, 323, 160, 218.1; 423/301
See application file for complete search history.

(56) References Cited

U.S. PATENT DOCUMENTS

| | | | |
|---|---|---|---|
| 2008/0241043 A1 | 10/2008 | Barker et al. | |
| 2009/0253025 A1* | 10/2009 | Whitacre | 429/50 |
| 2011/0171538 A1* | 7/2011 | Nandi et al. | 429/323 |
| 2011/0200848 A1* | 8/2011 | Chiang et al. | 429/4 |

FOREIGN PATENT DOCUMENTS

| | | | | |
|---|---|---|---|---|
| JP | 2006040640 A | | 2/2006 | |
| JP | 2010-260761 | * | 11/2010 | ............ C01B 25/455 |
| JP | 2010-260761 A | | 11/2010 | |
| KR | 10-2005-0111631 | | 11/2005 | |
| KR | 10-2010-0133231 A | | 12/2010 | |

OTHER PUBLICATIONS

Tarascon et al., "Hunting for Better Li-Based Electrode Materials via Low Temperature Inorganic Synthesis", Chemistry of Materials Review, vol. 22, No. 3, pp. 724-739 (2010).
Xiaobiao Wu et al., "Sol-gel synthesis and electrochemical properties of fluorophosphates Na2Fe1-xMnxPO4F/C (x = 0, 0.1, 0.3, 0.7, 1) composite as cathode materials for lithium ion battery", Journals of Materials Chemistry, vol. 21, pp. 18630-18637 (2011).

* cited by examiner

*Primary Examiner* — Khanh Tuan Nguyen
(74) *Attorney, Agent, or Firm* — Edwards Wildman Palmer LLP; Peter F. Corless (57) ABSTRACT

Disclosed are a cathode material for a secondary battery, and a manufacturing method of the same. The cathode material includes a lithium manganese phosphate $LiMnPO_4$/sodium manganese fluorophosphate $Na_2MnPO_4F$ composite, in which the $LiMnPO_4$ and $Na_2MnPO_4F$ have different crystal structures. Additionally, the method of manufacturing the cathode material may be done in a single step through a hydrothermal synthesis, which greatly reduces the time and cost of production. Additionally, the disclosure provides that the electric conductivity of the cathode material may be improved through carbon coating, thereby providing a cathode material with excellent electrochemical activity.

22 Claims, 6 Drawing Sheets

(a) 1.0V cut off

FIG.4A

(b) 2.0V cut off

FIG.4B (a) 1.0V cut off

FIG.5A (b) 2.0V cut off

CATHODE MATERIAL FOR SECONDARY BATTERY AND MANUFACTURING METHOD OF THE SAME

CROSS-REFERENCE TO RELATED APPLICATION

This application claims under 35 U.S.C. §119(a) the benefit of Korean Patent Application No. 10-2011-0127265 filed on Nov. 30, 2011, the entire contents of which are incorporated herein by reference.

BACKGROUND (a) Technical Field

The present invention relates to a cathode material for a secondary battery, and a method of manufacturing the same. More particularly, it relates to a cathode material for a secondary battery, and a method of manufacturing the same, wherein a lithium manganese phosphate $LiMnPO_4$/sodium manganese fluorophosphate $Na_2MnPO_4F$ composite can be used as an electrode material.

(b) Background Art

As the use of portable small-sized electronic devices has increased, there has been rapid progress in the development of new types of secondary batteries such as nickel metal hydrogen or lithium secondary batteries. In particular, the lithium secondary battery uses carbon (such as, e.g., graphite) as an anode active material, and lithium-containing oxide as a cathode active material, while using a non-aqueous solvent as an electrolyte. Lithium is a metal that has a very high ionization tendency, and thus can achieve a high voltage. Consequently, lithium is used in the development of batteries having a high energy density.

A lithium transition metal oxide containing lithium is mainly used as the cathode active material, and also, 90% or more of the lithium transition metal oxide used for the cathode active material includes layered lithium transition metal oxides (such as, e.g., cobalt-based, nickel-based, and cobalt/nickel/manganese ternary-based). However, when layered lithium transition metal oxide mainly is used as a cathode active material, lattice oxygen may be deintercalated and made to participate in a reaction under a non-ideal state (overcharge and high temperature). Disadvantageously, this may cause significant problems, such as the battery catching fire.

In order to overcome these disadvantages, research on a cathode active material having a spinel or olivine structure has been conducted. As a means for solving the problems with lithium secondary batteries such as, for example, the lowering of stability due to cathode deterioration, it has been suggested that spinel-based lithium manganese oxide having a three dimensional lithium movement path, and polyanion-based lithium metal phosphate including an olivine structure, may be used as a cathode material instead of layered lithium transition metal oxide. Unfortunately, the use of spinel-based lithium manganese oxide is limited because it causes lithium elution during charging/discharging cycles, which causes structural instability due to the Jahn-Teller distortion effect.

With respect to the olivine-based lithium metal phosphates, iron (Fe)-based phosphate and manganese (Mn)-based phosphate have low electric conductivity, which greatly limits their use as a cathode material. However, through nano-sized particles and carbon coating, the problem was improved, and thus their use as a cathode material has become possible.

It has been recently been reported that fluorophosphate (containing fluorine) may be used as a polyanion-based material. Fluorophosphate has a formula including fluorine, for example, $A_2MPO_4F$, where A represents Li or Na, and M represents a transition metal such as Mn, Fe, Co, Ni, V, or a mixture thereof. Theoretically, fluorophosphate is expected to show a capacity about twice as high as a conventional lithium metal phosphate since it has two Na atoms. Also, in the case where $Na_2MPO_4F$ (M=Mn, Fe, Co, Ni, V, or a mixture thereof) is used as a cathode material for a lithium secondary battery, the sodium is deintercalated during an initial charging step, lithium is intercalated during an initial discharging step, and then in following cycles, intercalation/deintercalation of lithium is carried out during charging/discharging. Also, in the case where it is used as a cathode material for a sodium secondary battery, the intercalation/deintercalation of sodium is carried out during charging/discharging. Disadvantageously, iron (Fe)-based $LiFePO_4$ and $Na_2FePO_4F$ have a low charge/discharge potential (about 3.5 V). A further disadvantage is that these cathode materials are typically synthesized through a complicated process of mixing by ball-milling, which increases their cost.

Accordingly, there is a need in the art for a low cost cathode material with excellent charge/discharge properties.

SUMMARY OF THE DISCLOSURE

The present invention provides a novel cathode material for a lithium secondary battery, and a method of manufacturing the same, in which a composite of lithium manganese phosphate ($LiMnPO_4$) and sodium manganese fluorophosphate ($Na_2MnPO_4F$) may be used as the cathode material. Advantageously, this composite can be synthesized in only one step, and it allows intercalation/deintercalation of lithium/sodium to be carried out.

In one exemplary embodiment, the present invention provides a cathode material for a secondary battery, in which the materials $LiMnPO_4$ and $Na_2MnPO_4F$ are uniformly mixed by a hydrothermal synthesis method.

In another exemplary embodiment, the present invention provides a method for manufacturing a cathode material for a secondary battery, in which a $LiMnPO_4$/$Na_2MnPO_4F$ composite is prepared in only one synthesis step, and the mixing ratio can be adjusted by adjusting ratios of Li and Na in the electrolyte.

Other aspects and exemplary embodiments of the invention are discussed infra.

As set forth above, the advantages of the present invention are as follows (i) According to the present invention, a composite of respective active materials is synthesized through only one synthesis step, which avoids the complicated process of mixing through ball-milling used for conventional art materials.

(ii) The inventive cathode material shows the same level of battery characteristics as a blending composite prepared by a simple mixing process.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

According to one exemplary embodiment, the present invention provides a cathode material for a secondary battery, which includes a composite containing both compounds of lithium manganese phosphate ($LiMnPO_4$) and sodium manganese fluorophosphate ($Na_2MnPO_4F$). Herein, the composite has a mixing ratio of x $LiMnPO_4$/1−x $Na_2MnPO_4F$, in which 0<x<1.

According to an exemplary embodiment of the present invention, the composite including both $LiMnPO_4$ and $Na_2MnPO_4F$ is provided as an inorganic ($LiMnPO_4$/$Na_2MnPO_4F$)/organic (Carbon) composite, in which a carbon conductive material is uniformly distributed.

According to an exemplary embodiment of the present invention, the lithium manganese phosphate ($LiMnPO_4$) and the sodium manganese fluorophosphate ($Na_2MnPO_4F$) have different crystal structures, wherein $LiMnPO_4$ has a crystal structure with a space group Pnma, and $Na_2MnPO_4F$ has a crystal structure with a space group $P2_1/n$.

In this specification, the term 'space group' for a crystal refers to the mathematical arrangement of symmetry elements of the crystal (i.e. a three dimensional symmetry group that divides space into repeatable domains). Three dimensional space groups are made from combinations of 32 crystallographic point groups with 14 Bravais lattices, which may belong to one of 7 lattice systems. This results in a space group being some combination of the translational symmetry of a unit cell including lattice centering, and the point group symmetry operations of reflection, rotation and improper rotation. Furthermore, unlike a point group, a space group also contains symmetry operations due to translational elements, such as a screw axis symmetry operation including rotational and translational operations, and a glide plane symmetry operation including reflection and translational operations. The combination of all of these symmetry operations results in a total of 230 unique space groups describing all possible crystal symmetries.

Hermann-Mauguin (aka international) notation is one of the most commonly used notations in crystallography, and consists of a set of up to four symbols. The first symbol describes the lattice centering of the Bravais. The next three symbols describe the most prominent symmetry operation visible when projected along one of the high symmetry directions of the crystal. These symbols are the same as those used in point groups, with the addition of glide planes and screw axes, as described above.

In an exemplary embodiment of the present invention, the space group Pnma is included in an orthorhombic space group No. 62, and the space group $P2_1/n$ of $Na_2MnPO_4F$ is included in a monoclinic space group No. 14.

According to another embodiment of the present invention, the present invention provides a method for manufacturing a cathode material for a secondary battery, the method including the steps of:

(i) mixing lithium (Li) oxide or a precursor thereof, sodium (Na) oxide or a precursor thereof, manganese (Mn) oxide or a precursor thereof, phosphate (P) or a precursor thereof, or fluoride (F) or a precursor thereof through a hydrothermal synthesis method;

(ii) heat-treating a mixture obtained by the hydrothermal synthesis method; and (iii) adding a carbon material to a synthesized cathode material, and uniformly mixing the materials through ball milling.

According to an exemplary embodiment of the present invention, the lithium manganese phosphate ($LiMnPO_4$) and the sodium manganese fluorophosphate ($Na_2MnPO_4F$) have different crystal structures, and $LiMnPO_4$ has a space group of Pnma, and $Na_2MnPO_4F$ has a space group of $P2_1/n$.

According to an exemplary embodiment of the present invention, in step (ii), the mixture obtained by the hydrothermal synthesis method is fired under an argon (Ar) atmosphere at 500° C. for 6 hours.

According to an exemplary embodiment of the present invention, in the step (iii), the mixture obtained from step (i) is mixed with a carbon conductive material, followed by ball-milling, so as to provide a composite including a cathode material coated with carbon.

According to an exemplary embodiment of the present invention, in step (i), the precursor of the lithium oxide may be, but is not particularly limited to, any Li precursor selected from the group including lithium phosphate, lithium carbonate, lithium hydroxide, lithium acetate, lithium sulfate, lithium sulfite, lithium fluoride, lithium chloride, lithium bromide, lithium iodide, and any mixture thereof.

According to an exemplary embodiment of the present invention, the precursor of the sodium oxide may be, but is not particularly limited to, any Na precursor selected from the group including sodium phosphate, sodium carbonate, sodium hydroxide, sodium acetate, sodium sulfate, sodium sulfite, sodium fluoride, sodium chloride, sodium bromide, and any mixture thereof.

According to an exemplary embodiment of the present invention, the precursor of the manganese oxide may be, but is not particularly limited to, any Mn precursor selected from the group including manganese metal, manganese oxide, manganese oxalate, manganese acetate, manganese nitrate, and any mixture thereof.

According to an exemplary embodiment of the present invention, the precursor of phosphate may be, but is not particularly limited to, any phosphate precursor selected from the group including ammonium phosphate, sodium phosphate, lithium phosphate, potassium phosphate, and any mixture thereof.

According to an exemplary embodiment of the present invention, the carbon conductive material used in step (iii) may be, but is not particularly limited to, any carbon conductive material selected from the group including carbon materials used as an electrode conductive material, such as super-P, acetylene black, Ketchen Black, and any combination thereof.

Hereinafter, the present invention will be described in more detail with reference to the accompanying drawings.

The present invention provides a cathode material for a secondary battery, which includes compounds represented by the Formula 1 below, as a composite:

$$xLiMnPO_4F/1-xNa_2MnPO_4F \quad \text{[Formula 1]}$$

wherein, $0<x<1$.

Hereinafter, the method for manufacturing a cathode material for a secondary battery, according to an exemplary embodiment of the present invention will be described. The specific manufacturing method will be more easily understood through the following examples.

First, the inventive composite cathode material may be prepared through hydrothermal synthesis. For example, respective starting materials corresponding to the respective desired elements are dissolved using distilled water as a solvent. The resulting solution having the respective materials dissolved therein is added to De-Ethyl-Glycol(DEG/$C_4H_{10}O_3$), and then introduced in a hydrothermal synthesis apparatus, and reacted. During the reaction, the inside of the hydrothermal synthesis apparatus is maintained at a predetermined pressure. After the reaction, the synthesized powder is washed and dried so as to collect only a pure synthetic product. Then, the synthetic product is fired in a heat treatment step so as to provide a composite of $LiMnPO_4/Na_2MnPO_4F$. The composite obtained as described above is further mixed with a carbon conductive material so as to improve the conductivity. As a result, an active material/carbon composite is prepared.

In the inventive composite, respective materials may be appropriately mixed in a ratio according to Formula 1 above, and the present invention is not limited to a specific mixing ratio.

The precursor of the lithium oxide may be selected from the group including lithium phosphate, lithium carbonate, lithium hydroxide, lithium acetate, lithium sulfate, lithium sulfite, lithium fluoride, lithium chloride, lithium bromide, lithium iodide and any mixture thereof.

The precursor of the sodium oxide may be, but is not particularly limited to, any one selected from the group including sodium phosphate, sodium carbonate, sodium hydroxide, sodium acetate, sodium sulfate, sodium sulfite, sodium fluoride, sodium chloride, sodium bromide, and any mixture thereof.

The precursor of the manganese oxide may be, but is not particularly limited to, any one selected from the group including manganese metal, manganese oxide, manganese oxalate, manganese acetate, manganese nitrate, and any mixture thereof.

The precursor of phosphate may be, but is not particularly limited to, any one selected from the group including sodium phosphate, lithium phosphate, potassium phosphate and any mixture thereof.

The precursor of fluorine may be, but is not particularly limited to, any one selected from the group including metal fluoride, fluoride, and any mixture thereof.

The carbon conductive material may be, but is not particularly limited to, super-P, acetylene black, Ketchen Black, a carbon material, or any combination thereof.

The inventive cathode material prepared as described above may be used for the manufacturing of a lithium secondary battery. Hereinafter, the configuration and the manufacturing method of the secondary battery will be briefly described.

First, in a process of manufacturing a cathode plate by using an exemplary embodiment of the inventive cathode material, the cathode material is combined with one, two, or more kinds of conventionally used additives, such as a conductive material, a binding agent, a filler, a dispersing agent, an ion conductive material, and a pressure enhancer, as required, and the mixture is formed into a slurry or paste with an appropriate solvent (organic solvent). Then, the resulting slurry or paste is applied to an electrode supporting substrate through a doctor blade method, etc., and then dried. Then, through pressing (e.g., by rolling a roll), a final cathode plate is manufactured.

Examples of the conductive material include graphite, carbon black, acetylene black, Ketchen Black, carbon fiber, metal powder, and the like. As the binding agent, PVdF, polyethylene, and the like may be used. The electrode supporting substrate (collector) may include a foil or a sheet of copper, nickel, stainless steel, aluminum, or carbon fiber.

By using the cathode plate prepared as described above, a lithium secondary battery is manufactured. The lithium secondary battery may be manufactured into a coin shape, a button shape, a sheet shape, a cylindrical shape, a square shape, etc. Also, an anode, an electrolyte, and a separator for the lithium secondary battery may be the same as those used in a conventional lithium secondary battery.

With respect to the anode active material, one, two, or more kinds of transition metal composite oxides including lithium may be used. For example, silicon, tin, etc. may be used as the anode active material.

With respect to the electrolyte, a non-aqueous electrolyte including lithium salt dissolved in an organic solvent, an inorganic solid electrolyte, or a composite of an inorganic solid electrolyte may be used. As the solvent for the non-aqueous electrolyte, one, two, or more kinds of esters (such as ethylene carbonate, propylene carbonate, dimethyl carbonate, diethyl carbonate, or methyl ethyl carbonate), lactones such as butyl lactone, ethers such as 1,2-dimethoxy ethane, ethoxy methoxy ethane, or nitriles such as acetonitrile may be used. Examples of lithium salt of the non-aqueous electrolyte may include $LiAsF_6$, $LiBF_4$, $LiPF_6$, or the like.

Also, as the separator, a porous film prepared from polyolefin such as PP and/or PE, or a porous material such as non-woven fabric may be used.

Hereinafter, the present invention will be described in detail with reference to examples, but the scope of the present invention is not limited to these examples.

EXAMPLE

A composite of $LiMnPO_4/Na_2MnPO_4F$ (1:1 ratio) was synthesized through hydrothermal synthesis according to the steps as described below. $LiH_2PO_4$ (99%), $NaH_2PO_4$ (99%), $Na_2CO_3$ (99.5%), $Mn(CH_3COO)_2$ $4H_2O$ (99%), and $MnF_2$ (99%) were used as starting materials in predetermined amounts. The respective materials were dissolved by distilled water as a solvent in an amount of 0.06 mol with respect to the solvent. The solution having the respective materials dissolved therein was added to 250 mL of De-Ethyl-Glycol (DEG/$C_4H_{10}O_3$). The solution was sequentially introduced in consideration of the reactivity of the materials. The mixture was introduced into a hydrothermal synthesis apparatus, followed by reaction at 200° C. for 5 hours at 250 rpm. During the reaction, the interior pressure of the hydrothermal synthesis apparatus was maintained at about 8 atm. After the reaction, the resulting powder was washed and dried in anhydrous ethanol so as to remove impurities. The powder was subjected to centrifugation so as to remove DEG. The resulting powder was introduced to anhydrous ethanol-, followed by stirring for 30 minutes, and was subjected to centrifugation so as to remove the organic matter produced after the reaction with the anhydrous ethanol. This step was carried out three times or more. After the washing step was completed, the powder was dried in a vacuum oven (60° C.) for 12 hours or more. The resulting powder was heat-treated by using a firing furnace at 400° C., for 6 hours, under an argon gas atmosphere so as to provide a powder of $LiMnPO_4/Na_2MnPO_4F$ (1:1).

Comparative Example 1

$LiMnPO_4$ was synthesized through hydrothermal synthesis according to the steps as described below. $LiH_2PO_4$ (99%), and $Mn(CH_3COO)_2.4H_2O$ (99%) were used as starting materials in predetermined amounts. The respective materials were dissolved in distilled water as a solvent in an amount of 0.06 mol with respect to the solvent. The solution having respective materials dissolved therein was introduced to 250 mL of De-Ethyl-Glycol (DEG/$C_4H_{10}O_3$). The solution was sequentially introduced in consideration of the reactivity of the materials. The mixture was introduced into a hydrothermal synthesis apparatus, followed by a reaction at 180° C. for 5 hours at 250 rpm. During the reaction, the inside pressure of the hydrothermal synthesis apparatus was maintained at about 8 atm. After the reaction, the resulting powder was washed and dried so as to remove impurities. For the washing step, anhydrous ethanol was used. The powder was subjected to centrifugation so as to remove DEG. The resultant powder was introduced to anhydrous ethanol, followed by stirring for 30 minutes. The resultant powder was subjected to centrifugation so as to remove the organic matter produced after the reaction with the anhydrous ethanol]. This step was carried out three times or more. After the washing step was completed, the powder was dried in a vacuum oven (60° C.) for 12 hours or more. The resulting powder was heat-treated by using a firing furnace at 400° C., for 6 hours, under an argon gas atmosphere so as to provide a powder of $LiMnPO_4$.

Comparative Example 2

$Na_2MnPO_4F$ was synthesized by hydrothermal synthesis according to the steps as described below. $NaH_2PO_4$ (99%), $Na_2CO_3$ (99.5%), $Mn(CH_3COO)_2$ $4H_2O$ (99%), and $MnF_2$ (99%) were used as starting materials in predetermined amounts. The respective materials were dissolved in distilled water as a solvent in an amount of 0.06 mol with respect to the solvent. The solution having respective materials dissolved therein was added to 250 mL of De-Ethyl-Glycol (DEG/$C_4H_{10}O_3$). The solution was sequentially introduced in consideration of the reactivity of the materials. The mixture was introduced into a hydrothermal synthesis apparatus, followed by a reaction at 200° C. for 5 hours at 250 rpm. During the reaction, the inside pressure of the hydrothermal synthesis apparatus was maintained at about 8 atm. After the reaction, thus obtained powder was washed and dried so as to remove impurities. For the washing step, anhydrous ethanol was used. The powder was subjected to centrifugation so as to remove DEG. The resultant powder was introduced to anhydrous ethanol, followed by stifling for 30 minutes. The resultant powder was subjected to centrifugation so as to remove the organic matter produced after the reaction with the anhydrous ethanol. This step was carried out three times or more. After the washing step was completed, the powder was dried in a vacuum oven (60° C.) for 12 hours or more. The resulting powder was heat-treated by using a firing furnace at 400° C., for 6 hours, under an argon gas atmosphere so as to provide a powder of $Na_2MnPO_4F$.

Comparative Example 3

$LiMnPO_4$ and $Na_2MnPO_4F$ were synthesized according to Comparative Examples 1 and 2, respectively. The synthesized $LiMnPO_4$ and $Na_2MnPO_4F$ were mixed in a ratio of 1:1, and further uniformly mixed through ball-milling so as to provide a blended powder of $LiMnPO_4/Na_2MnPO_4F$ (1:1).

Experimental Example 1

Test on Properties of a Cathode Material

Figure 1:
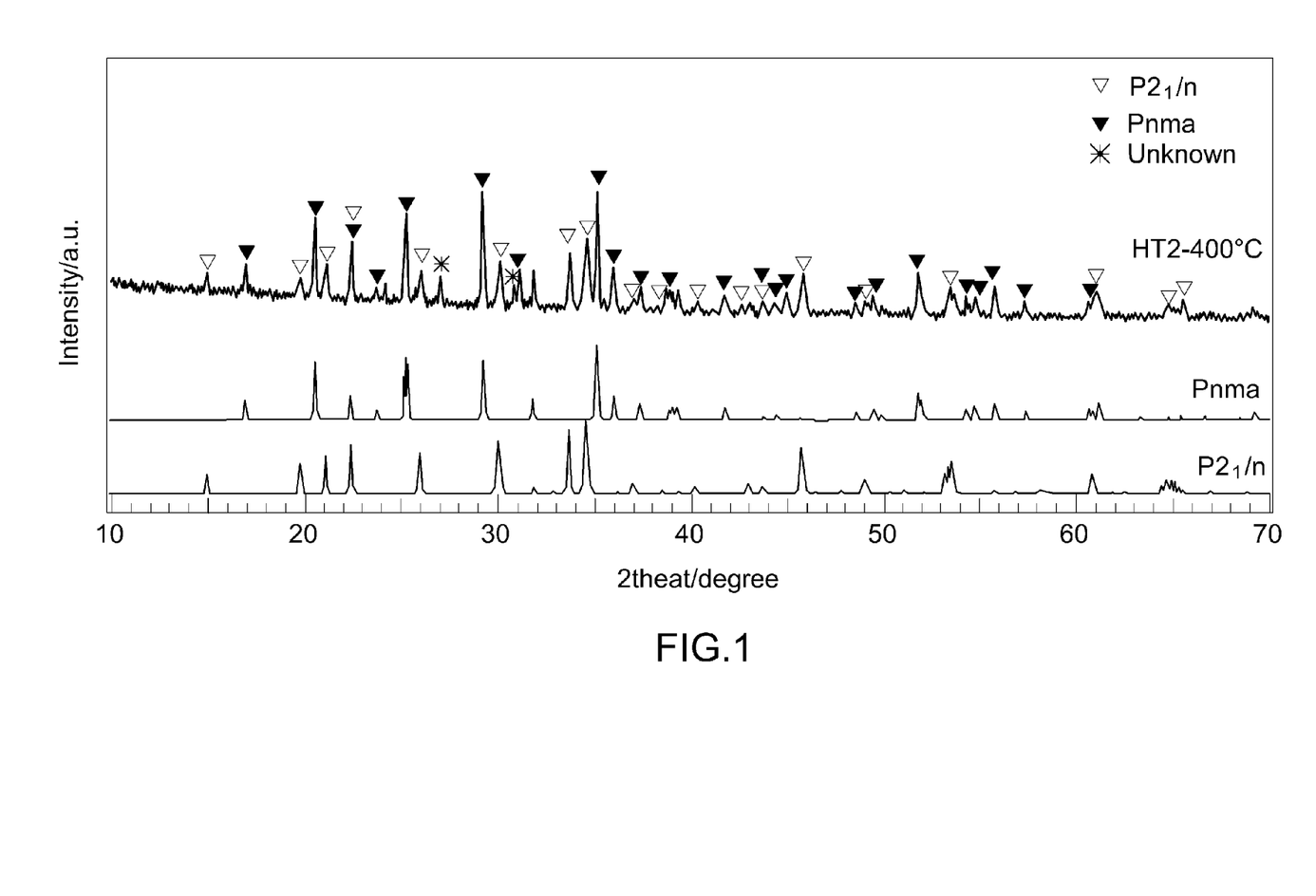
FIG. 1 shows a graph of X-ray diffraction analysis on an exemplary final composite cathode material for a lithium secondary battery, prepared according to Example 1.

The structure of the composite cathode material from Example 1 was measured by X-ray diffraction (XRD), and the diffraction diagram is shown in FIG. 1. It was found that $LiMnPO_4$ is identified as having a space group Pnma, and $Na_2MnPO_4F$ is identified as having a space group $P2_1/n$. From the intensity ratio of the diffraction peak, it was found that $LiMnPO_4$ and $Na_2MnPO_4F$ exist in a ratio of 1:1.

From the result of elementary analysis of Li and Na through ICP measurement, it was also found that Li and Na exist in a ratio of 1:1. Thus, it was confirmed that the LiMnPO$_4$/Na$_2$MnPO$_4$F composite prepared from Example 1 has LiMnPO$_4$ and Na$_2$MnPO$_4$F in a ratio of 1:1.

Figure 2A:
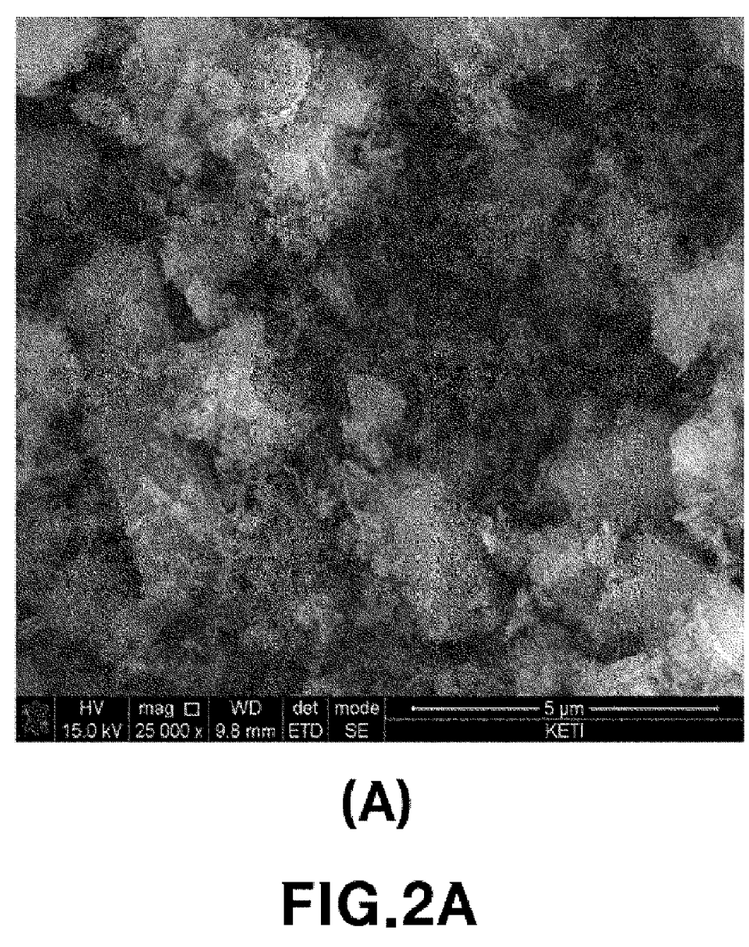
FIG. 2 shows electron microscopic images of an exemplary composite cathode material prepared according to Example 1.
Figure 2B:
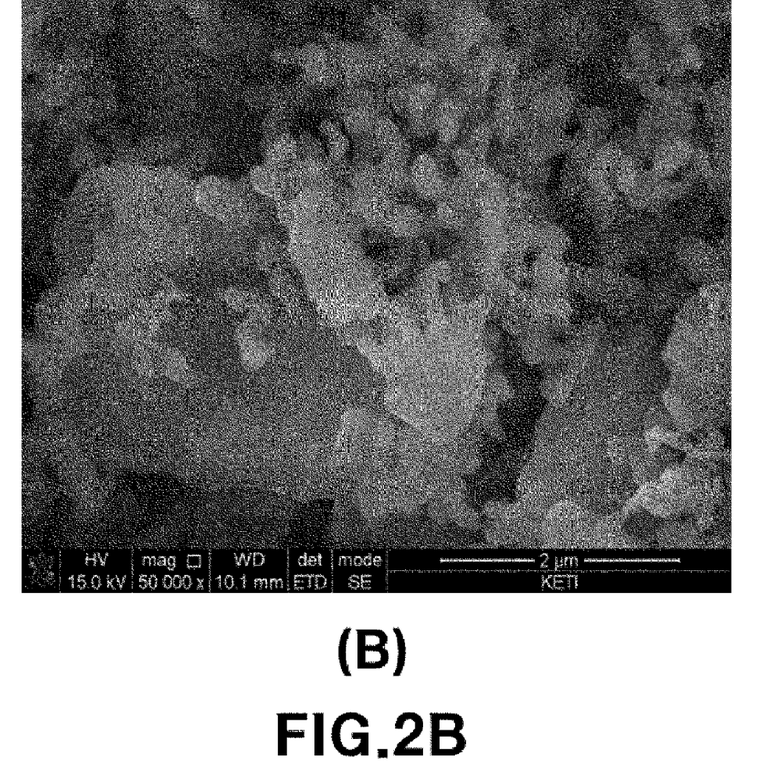
Figure 3:
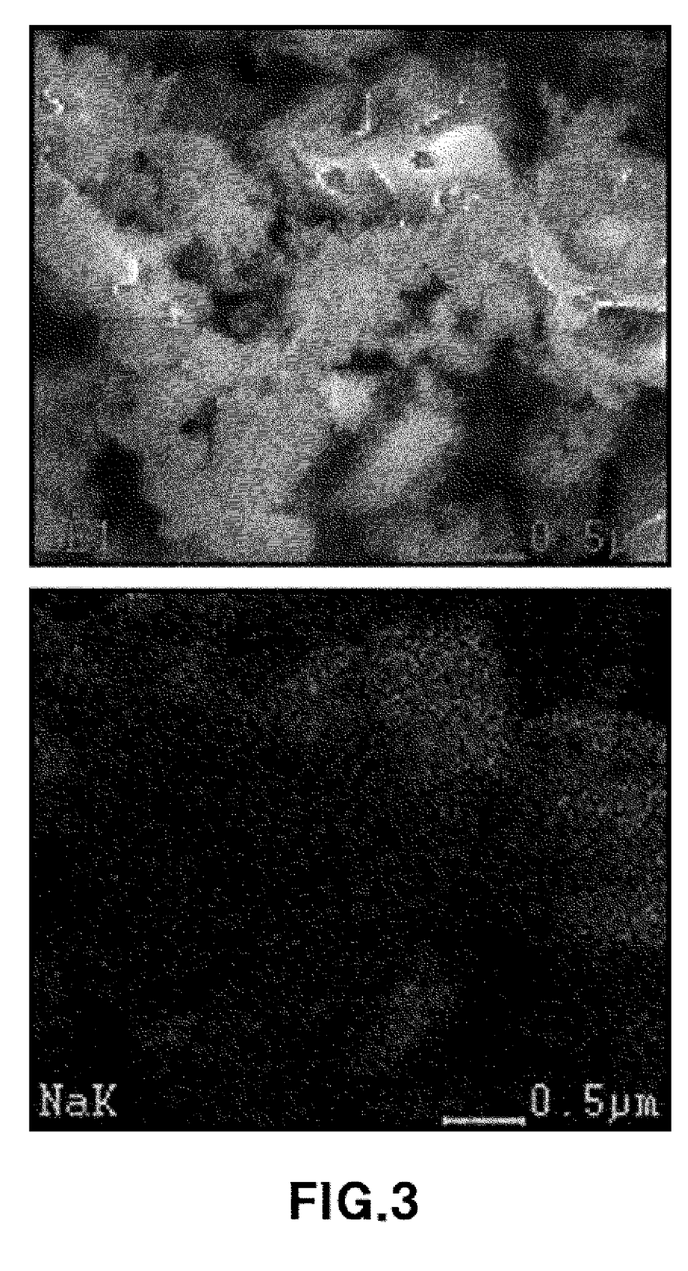
FIG. 3 shows EDX mapping images of an exemplary composite cathode material prepared according to Example 1.

In order to determine the shapes of LiMnPO$_4$ and Na$_2$MnPO$_4$F in the LiMnPO$_4$/Na$_2$MnPO$_4$F composite, SEM and EDX-mapping were carried out, and the results are shown in FIGS. 2 and 3. As shown in the SEM image of FIG. 2, it was found that there exist two separate kinds of particles such as a large particle with a size of several μm and a fine particle with a size of several nm. For further precise analysis, EDX-mapping on each element was carried out, and the result is shown in FIG. 3. From the result of the EDX-mapping, it was found that the large particle with a size of several μm is Na$_2$MnPO$_4$F, and the fine particle with a size of several nm is LiMnPO$_4$. Accordingly, it was determined that LiMnPO$_4$ and Na$_2$MnPO$_4$F with different particle shapes and different particle sizes are uniformly mixed with each other.

Experimental Example 2

Test on Electrochemical Characteristics

By using powder of the cathode material composite from Example 1 and Comparative Example 3, 95 wt % of cathode material composite was mixed with 5 wt % of binding agent PVdF, and then a slurry was prepared by using N-methyl pyrrolidone (NMP) as a solvent.

The slurry was applied on A1 foil with a thickness of 20 μm, and then dried and consolidated by press. The resultant product was dried under a vacuum at 120° C. for 16 hours, so as to provide a circular electrode with a diameter of 16 mm.

As a counter electrode, a lithium metal foil punched with a diameter of 16 mm was used, and as a separator, a polypropylene (PP) film was used. Also, as an electrolyte, a solution containing 1 M LiPF$_6$ in ethylene carbonate (EC) and dimethoxy ethane (DME) mixed in a ratio of 1:1 (v/v) was used. The electrolyte was impregnated in the separator, and the separator was positioned between the operating electrode and the counter electrode. Then, by using a case (SUS) as an electrode test cell, the electrode performance of a battery was tested.

Figure 4A:
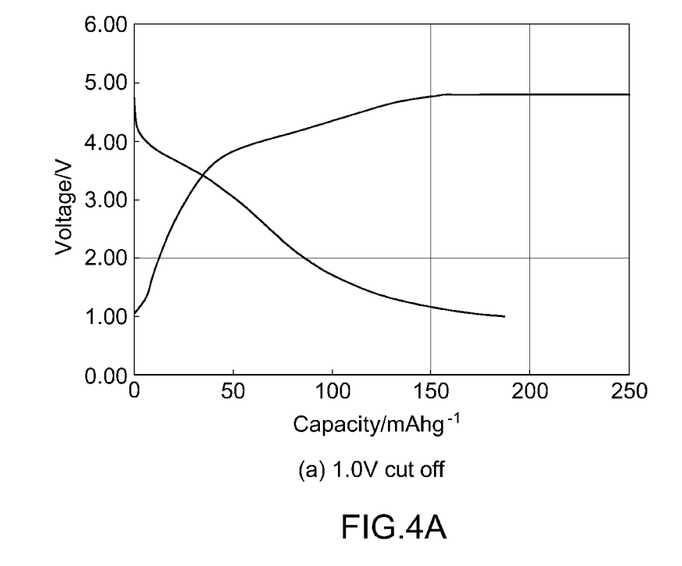
FIGS. 4A and 4B show charge/discharge curve graphs of a battery including an exemplary cathode material prepared according to Example 1, at room temperature.
Figure 4B:
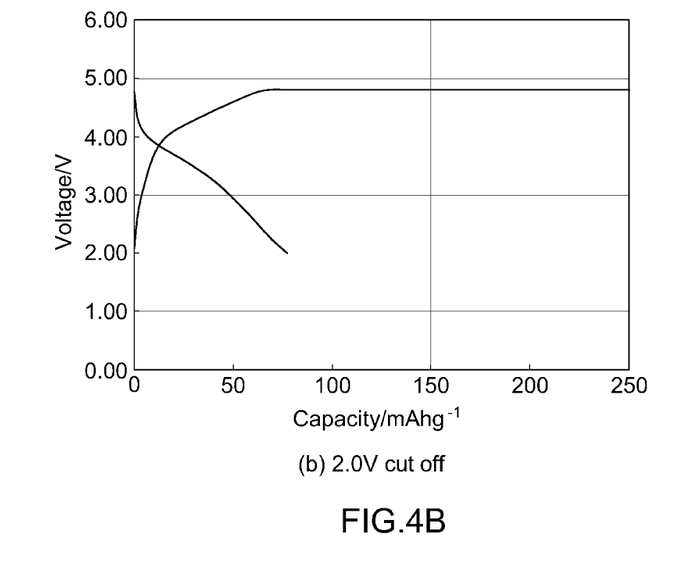

As shown in FIG. 4, which display charge/discharge curve graphs of a battery including a cathode material prepared from Example 1, at room temperature, it was found that there exists a narrow range of a plateau area at 3.8 V, and the battery shows a discharge capacity of 75 mAhg$^{-1}$ at a charge/discharge ranging from 2.0 V to 4.8 V, and a discharge capacity of 161 mAhg$^{-1}$ at a charge/discharge ranging from 1.0 V to 4.8 V. Thus, it was determined that the LiMnPO$_4$/Na$_2$MnPO$_4$F composite can be used as an electrode material.

Figure 5A:
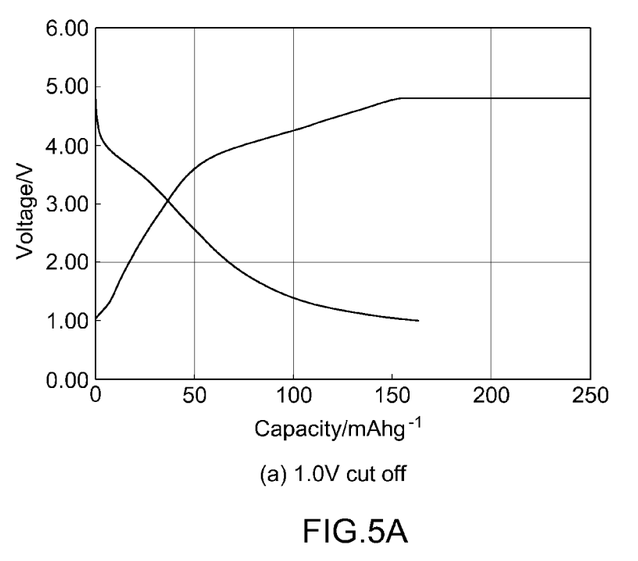
FIGS. 5A and 5B show charge/discharge curve graphs of a battery including an exemplary cathode material prepared according to Comparative Example 5, at room temperature.
Figure 5B:
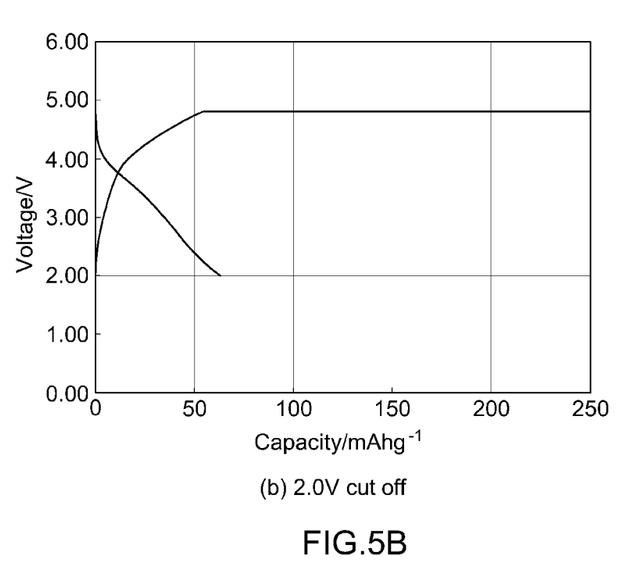

FIG. 5 shows charge/discharge curve graphs of a battery including a cathode material prepared from Comparative Example 3, at room temperature. It can be determined that there is no significant difference between batteries including the materials from Example 1 and Comparative Example 3 in the charge/discharge characteristics. Accordingly, it can be determined that the electrode material of the LiMnPO$_4$/Na$_2$MnPO$_4$F composite according to the present invention can be prepared by only one synthesis as compared to a conventional blending mixture obtained by mixing two materials, and thus is advantageous in the manufacturing process and the economical efficiency.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A cathode material, comprising a composite of lithium manganese phosphate and sodium manganese fluorophosphate, wherein the cathode material is formed by mixing LiMnPO$_4$ and Na$_2$MnPO$_4$F at a mixing ratio of x LiMnPO$_4$/1-x Na$_2$MnPO$_4$F (0<x<1).

2. The cathode material of claim 1, further comprising a carbon conductive material uniformly distributed throughout.

3. The cathode material of claim 2, wherein the carbon conductive material is selected from the group consisting of super-P, acetylene black, and Ketchen Black.

4. The cathode material of claim 2, wherein the cathode material is an inorganic/organic composite material, wherein the inorganic composite material is LiMnPO$_4$/Na$_2$MnPO$_4$F and the organic composite material is carbon.

5. The cathode material of claim 4, wherein the LiMnPO$_4$ has a crystal structure with a space group Pnma and the Na$_2$MnPO$_4$F has a crystal structure with a space group P2$_1$/n.

6. The cathode material of claim 1, wherein the lithium manganese phosphate and the sodium manganese fluorophosphate have different crystal structures.

7. A method of manufacturing a composite cathode material, comprising:
(i) mixing lithium (Li) oxide or a precursor thereof, sodium (Na) oxide or a precursor thereof, manganese (Mn) oxide or a precursor thereof, phosphate (P) or a precursor thereof, and/or fluoride (F) or a precursor thereof;
(ii) synthesizing composite powders using the mixture of step (i) through a hydrothermal synthesis method;
(iii) heat-treating the composite powders obtained from step (ii); and
(iv) optionally adding a carbon material to the composite powders of step (iii) and ball milling,
wherein the composite powders comprise LiMnPO$_4$ and Na$_2$MnPO$_4$F at a mixing ratio of x LiMnPO$_4$/1-x Na$_2$MnPO$_4$F (0<x<1).

8. The method of claim 7, wherein the LiMnPO$_4$ and the Na$_2$MnPO$_4$F have different crystal structures.

9. The method of claim 7, wherein the LiMnPO$_4$ has a crystal structure with a space group Pnma and the Na$_2$MnPO$_4$F has a crystal structure with a space group P2$_1$/n.

10. The method of claim 7, wherein in the heat-treating of step (iii) comprises:
firing under an argon (Ar) atmosphere at 500° C. for 6 hours.

11. The method of claim 7, wherein the precursor of the lithium oxide is any one selected from the group consisting of lithium phosphate, lithium carbonate, lithium hydroxide, lithium acetate, lithium sulfate, lithium sulfite, lithium fluoride, lithium chloride, lithium bromide, lithium iodide, and any mixture thereof.

12. The method of claim 7, wherein the precursor of the sodium oxide is any one selected from the group consisting of sodium phosphate, sodium carbonate, sodium hydroxide, sodium acetate, sodium sulfate, sodium sulfite, sodium fluoride, sodium chloride, sodium bromide, and any mixture thereof.

13. The method of claim 7, wherein the precursor of the manganese oxide is any one selected from the group consisting of manganese metal, manganese oxide, manganese oxalate, manganese acetate, manganese nitrate, and any mixture thereof.

14. The method of claim 7, wherein the precursor of the phosphate is any one selected from the group consisting of ammonium phosphate, sodium phosphate, lithium phosphate, potassium phosphate, and any mixture thereof.

15. The method of claim 7, wherein the carbon conductive material used in the step (iv) is any one selected from the group consisting of super-P, acetylene black, and Ketchen black.

16. The method of claim 7, wherein the reaction synthesizing of step (ii) takes place at 180° C. for 5 hours at 250 rpm.

17. The method of claim 16, wherein the synthesis reaction is carried out at a pressure of 8 atm.

18. The method of claim 7, wherein step (ii) further comprises:
   washing the composite powders by mixing with anhydrous ethanol for 30 minutes; and
   centrifuging the composite powders/anhydrous ethanol mixtures to remove organic material.

19. The method of claim 18, wherein the washing step is carried out 3 or more times.

20. The method of claim 18, further comprising vacuum drying the composite powders/anhydrous ethanol mixtures for 12 hours or more at 60° C. to obtain purified the composite powders of $LiMnPO_4$ and $Na_2MnPO_4F$.

21. A cathode material manufactured by the method of claim 7, comprising a composite of $LiMnPO_4$ and $Na_2MnPO_4F$.

22. The cathode material of claim 21, further comprising a carbon conductive material uniformly distributed throughout.

* * * * *